United States Patent [19]

Reba

[11] 4,215,956

[45] Aug. 5, 1980

[54] SYSTEM FOR DISPERSING AND TRANSPORTING PARTICULATE MATTER

[75] Inventor: Imants Reba, Vancouver, Wis.

[73] Assignee: Crown Zellerbach Corporation, San Francisco, Calif.

[21] Appl. No.: 12,178

[22] Filed: Feb. 14, 1979

[51] Int. Cl.³ .................. B65G 53/14; B65G 53/42
[52] U.S. Cl. .................................. 406/152; 406/153; 406/194; 406/195
[58] Field of Search ................ 406/82, 144, 153, 157, 406/194, 195, 152; 209/145; 239/419.3, 419.5, 427.5, DIG. 7

[56] References Cited

U.S. PATENT DOCUMENTS

| 3,490,654 | 1/1970 | Fischer | 406/195 X |
| 3,504,945 | 4/1970 | Leibundgut et al. | 406/144 |
| 3,859,205 | 1/1975 | Reba et al. | 209/145 X |

*Primary Examiner*—James L. Rowland
*Attorney, Agent, or Firm*—Thomas R. Lampe

[57] ABSTRACT

A system for dispersing and transporting particulate matter including a fluidizing chamber and means for introducing particulate matter into the chamber and directing it against fluid entering the chamber from another location. A Coanda nozzle communicates with the chamber and entrains the particulate matter and fluid in the fluidizing chamber and transports same in a direction differing from the original directions of movement of the particulate matter and fluid.

12 Claims, 3 Drawing Figures

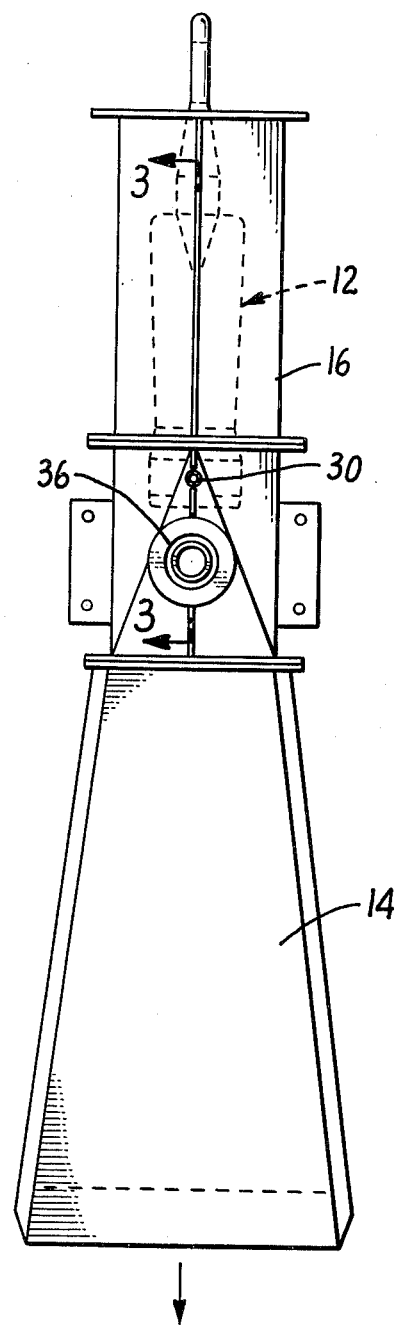
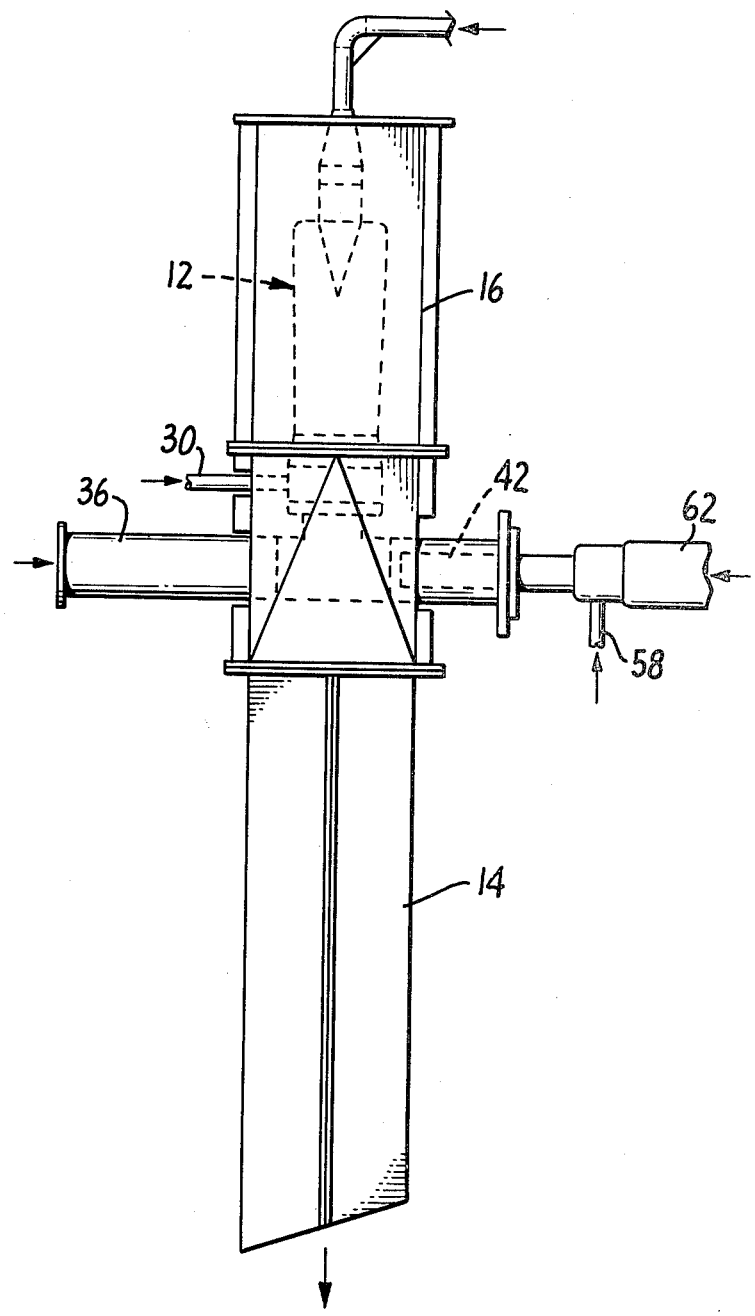

SYSTEM FOR DISPERSING AND TRANSPORTING PARTICULATE MATTER

BACKGROUND OF THE INVENTION

The present invention relates to a method and apparatus for dispersing and transporting particulate matter.

U.S. Pat. No. 3,859,205 issued to Reba et. al. describes a system utilizing the Coanda effect to separate or disperse particulate matter such as polyethylene fibers or the like and transport the dispersed fibers to a predetermined location. The system of U.S. Pat. No. 3,859,205 has been utilized in conjunction with a forming bell to lay down a layer of fibers that have been dispersed and transported on to a moving wire to form a nonwoven web. While the system of U.S. Pat. No. 3,859,205 has been satisfactory in most respects some operational difficulties have arisen under certain conditions.

In particular, in the arrangement of U.S. Pat. No. 3,859,205 particulate matter such as polyethylene fibers is supplied to the first nozzle assembly thereof through a supply pipe at right angles to the main axis of the first nozzle assembly. Thus, the fibers must turn substantially 90 degrees prior to entering the first flow path defined by the first nozzle assembly. Because of centrifugal forces, fibers tend to be separated from the air stream with which they are associated and move to the outside when making the turn. Thus, the apparatus is not loaded symmetrically at the outset, resulting in nonuniformity of the web being formed by the system. Still other problems of nonuniformity have been created by a swirling effect that occasionally takes place within the first nozzle assembly as a result of the fibers making the aforesaid 90 degree turn.

It is therefore an object of the present invention to provide an improved apparatus and method for dispersing and transporting particulate matter resulting in the more uniform distribution of particulate matter such as polyethylene fibers.

SUMMARY OF THE INVENTION

The above and other objects have been attained by providing an apparatus for dispersing and transporting particulate matter comprising in combination a fluidizing chamber having fluid ingress defining means through which fluid is adapted to flow in a predetermined direction, means for introducing the particulate matter into the fluidizing chamber and directing it in opposition to the flow direction of the fluid, and a Coanda nozzle communicating with the chamber to entrain the fluidized particulate matter and transport same in yet another direction. The fluidizing chamber comprises a conduit and the means for introducing particulate matter comprises a pipe positioned within the conduit interior and means in operative association with the pipe to propel particulate matter through the pipe into the conduit interior, at which location the particulate matter impinges against the fluid entering the conduit and mixes therewith. Because the particulate matter is in a fluidized state prior to its introduction into the Coanda nozzle, uniform dispersement of the particulate matter is attained.

BRIEF DESCRIPTION OF THE DRAWINGS

FIGS. 1 and 2 are front and side elevational views, respectively, of the apparatus of this invention disposed in operative association with a forming bell.

GENERAL DESCRIPTION

Figure 3:
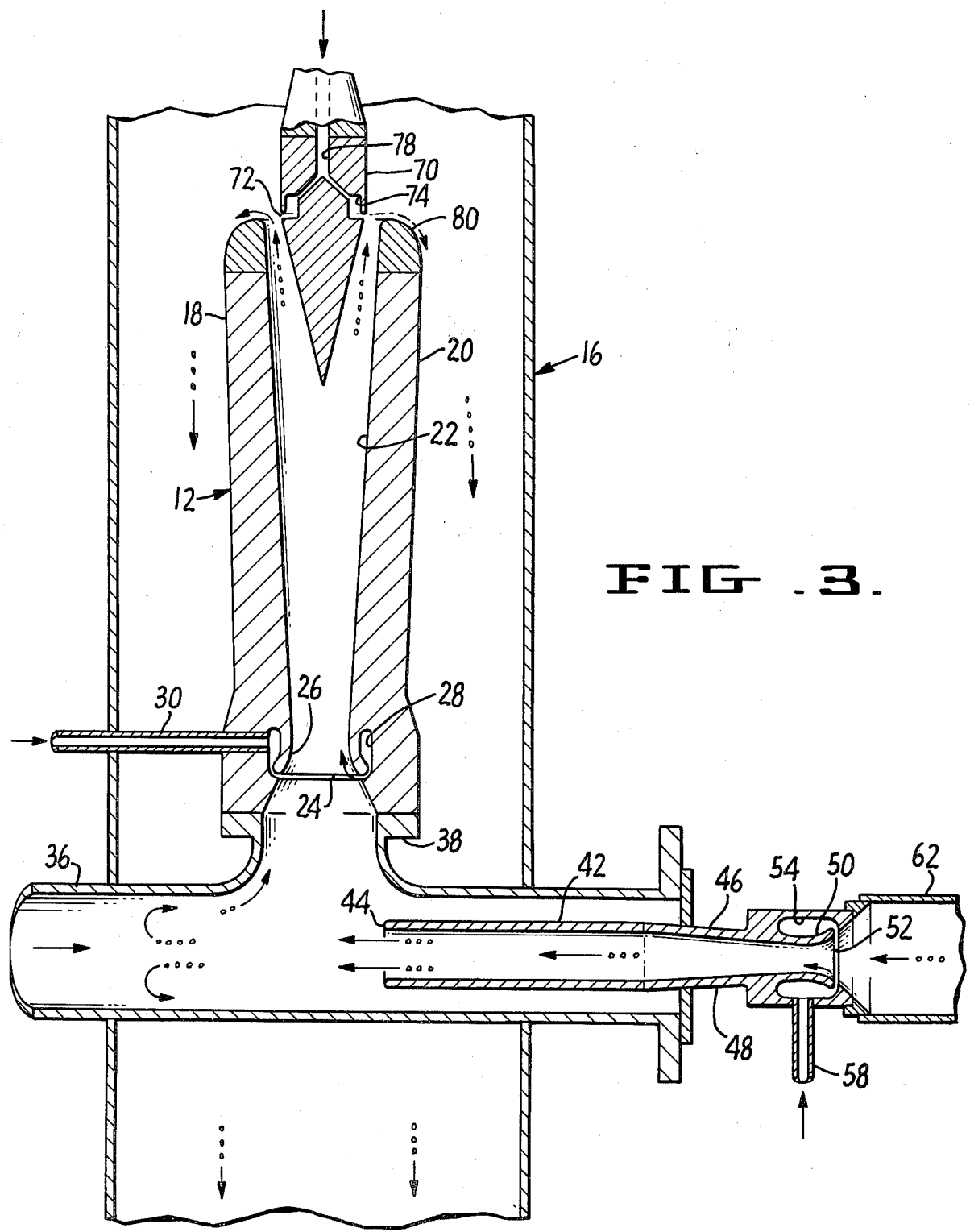
FIG. 3 is an enlarged side sectional view showing operational details of apparatus constructed in accordance with the teachings of the present invention.

FIGS. 1 and 2 illustrate the apparatus of the present invention, designated generally by means of reference numeral 12, in operative association with a forming bell 14 of any suitable type. Since the forming bell per se does not comprise a portion of the present invention it will not be described in detail. Suffice it to say that the forming bell is of four-sided construction defining a circular inlet at the upper end thereof and a generally rectangular shaped outlet. It is to be understood that the forming bell 14 performs the conventional functions of receiving particulate matter and spreading same laterally on a moving receiving surface such as a foraminous screen (not shown) to form a nonwoven web. Connected to the upper end of forming bell 14 by any suitable expedient is a shroud member 16 in the form of a conduit having a circular cross section corresponding to the circular cross section of the top of forming bell 14. Shroud member 16 may if desired be formed of a plurality of sections bolted or otherwise secured together.

Referring now to FIG. 3, apparatus 12 includes a Coanda nozzle 18 disposed within shroud member 16 and substantially coaxial therewith. The Coanda nozzle 18 is comprised of an elongated diffuser member 20 defining a diverging flow path 22 of circular cross section and means defining an annular slit 24 in communication with flow path 22. Annular slit 24 is defined by a curved annular lip 26 which extends about the interior of elongated member 20. Annular lip 26 also forms with the outer portion of the elongated member an annular fluid pressure chamber which is in fluid flow communication with a pressurized fluid supply line 30 connected at the other end thereof to any suitable source of pressurized fluid such as an air compressor (not shown). It will be appreciated that when communication is established between supply line 30 and a source of pressurized fluid said fluid will enter fluid pressure chamber 28 and exit from annular slit 24. Due to the Coanda effect, which is described in detail in the aforesaid U.S. Pat. No. 3,859,205, the fluid exiting from slit 24 will attach itself to and follow the generally curved surface of annular lip 26 so that it flows upwardly in the flow path 22 defined by elongated number 20. This rapidly moving air establishes a zone of reduced pressure on the opposite side of slit 24 from lip 26 so that the rapidly moving air entrains additional air and any particulate matter located in this zone of reduced pressure. Particles entrained by this fluid are thereby rapidly transported from the lower inlet end of the flow path 22 to the upper outlet end thereof.

Positioned below Coanda nozzle 18 is a fluidizing chamber in the form of a conduit 36. Conduit 36 has a flanged outlet portion 38 upon which Coanda nozzle 18 is positioned and secured by any suitable expedient such as metal screws, bolts, etc. Conduit 36 is open to the atmosphere at the left end thereof as viewed in FIG. 3. The right hand end of the conduit 36 is in operative association with means for introducing particulate matter into the fluidizing chamber. Specifically, a pipe 42 is positioned within the interior of conduit 36, said pipe having a substantially smaller diameter than the diameter of the conduit and disposed coaxially therewith. Pipe 42 has a terminal end 44 positioned adjacent to Coanda nozzle 18 with the other end of pipe 42 being connected to the outlet of an auxiliary Coanda nozzle 46. Nozzle 46 includes an elongated member 48 defining a diverging inner flow path and an annular lip 50 defining an annular slit 52 leading from fluid pressure chamber 54. Fluid pressure chamber 54 is in turn in communication with the interior of a pressurized fluid supply line 58. It will be appreciated that auxiliary Coanda nozzle 46 operates in the same manner as previously described with respect to Coanda nozzle 18, that is, pressurization of fluid pressure chamber 54 will cause a rapid movement of air or other fluid through slit 52 whereupon said air will attach itself to the curved inner surface of annular lip 50 and proceed to the left as viewed in FIG. 3 through the flow path defined by elongated member 48 and pipe 42. Attached to the lip defining portion of the auxiliary Coanda nozzle 46 is a tubular element 62 which is attached at the other end thereof to a source (not shown) of particulate matter such as polyethylene fibers to be introduced into the system. Auxiliary Coanda nozzle 46 will entrain said fibers and propel them through the pipe 42 and into the interior of conduit 36.

At the time fibers are ejected from the end of pipe 42, Coanda nozzle 18 is also pressurized and in operation entraining air from fluidizing chamber 36. This creates a vacuum within the chamber and results in ambient air entering from the open left end of the fluidizing chamber conduit in a direction diametrically opposed to the direction of movement of particulate matter exiting from pipe 42. This entrained air prevents fiber escape by reversing their trajectories as shown by the arrows and also provides additional dilution. Thus, a virtually stationary cloud of fibrous material approaching evenly from all sides is positioned under outlet portion 38. This results in uniformly fluidized particles being entrained by Coanda nozzle 18 and passing upwardly through flow path 22 defined by elongated member 20. It is important that Coanda nozzle entrainment capacity be greater than that of auxiliary Coanda nozzle 46 in order to insure that the described operation occurs.

Disposed coaxially with Coanda nozzle 18 is a curtain nozzle 70. A slit 72 is formed about the periphery of curtain nozzle 70, said slit leading from fluid pressure chamber 74 formed in the curtain nozzle. Fluid pressure chamber 74 is in communication with a flow path 78 for pressurized fluid such as compressed air so that a high speed air curtain radiates outwardly from curtain nozzle 70. The high speed fluid curtain contacts the outer curved shoulder 80 of Coanda nozzle 18 so that the curtain attaches to the shoulder due to the Coanda effect and flows downwardly between elongated member 20 and shroud member 16 to the forming bell 14. When the entrained particulate matter engages the curtain it will be entrained thereby and transported to the forming bell.

What is claimed is:

1. Apparatus for dispersing and transporting particulate matter comprising in combination:
   a conduit having an interior and an open end in communication with the ambient atmosphere;
   a Coanda nozzle defining a flow path in fluid flow communication with said conduit interior and adapted to induce a flow of ambient air in said conduit through said open end;
   particulate matter injection means disposed in the end of said conduit remote from said open end, said injection means adapted to introduce particulate matter into said conduit in a direction substantially diametrically opposed to the direction of flow of ambient air in said conduit, said Coanda nozzle being positioned in close proximity to the location in said conduit whereat said particulate matter impinges against said ambient air in said conduit interior whereby flow of air dispersed particulate material will be induced by said Coanda nozzle along said Coanda nozzle flow path.

2. The apparatus according to claim 1 wherein said particulate matter injection means is a second Coanda nozzle, said Coanda nozzle defining a flow path having a greater entraining capacity than said second Coanda nozzle.

3. Apparatus for dispersing and transporting particulate matter comprising in combination:
   a fluidizing chamber having fluid ingress defining means through which fluid is adapted to flow in a predetermined direction;
   means for introducing said particulate matter into said fluidizing chamber and directing said particulate matter in a predetermined direction within said fluidizing chamber toward said fluid ingress defining means in opposition to the direction of flow of said fluid;
   a Coanda nozzle having at least one fluid flow attachment surface and defining a flow path communicating with the chamber adapted to entrain both said particulate matter and fluid in said fluidizing chamber and transport said particulate matter and fluid along said flow path in a direction differing from said predetermined directions; and
   a curtain nozzle positioned adjacent to said Coanda nozzle adapted to generate a high velocity curtain across the flow path defined by the Coanda nozzle and direct particulate matter flowing along the flow path toward a fluid flow attachment surface.

4. The apparatus of claim 3 wherein said Coanda nozzle includes an elongated member extending from the fluidizing chamber and defining said flow path for the fluid and particulate matter entrained by said Coanda nozzle and means defining an annular slit in communication with said flow path, said elongated member including a generally curved fluid-flow attachment surface leading from said slit to the flow path.

5. The apparatus of claim 4 wherein said elongated member has a terminal end spaced from said fluidizing chamber, said elongated member having a second fluid-flow attachment surface at said terminal end leading from the flow path defined by said elongated member to the exterior of said elongated member.

6. The apparatus according to claim 5 wherein said curtain nozzle is positioned adjacent to the elongated member terminal end and said curtain nozzle high-velocity fluid curtain flows across the flow path defined by said elongated member and directs particulate matter flowing along said flow path toward said second fluid-flow attachment surface.

7. The apparatus according to claim 3 wherein said fluidizing chamber comprises a conduit and wherein said means for introducing particulate matter comprises a pipe positioned within the conduit interior having a terminal end positioned adjacent to said Coanda nozzle and means in operative association with said pipe to propel particulate matter through said pipe into said conduit interior whereat said particulate matter impinges against the fluid entering the conduit from the end thereof.

8. The apparatus of claim 7 wherein said pipe has a substantially smaller diameter than the diameter of said conduit and is disposed coaxially therewith.

9. The apparatus of claim 3 wherein said fluidizing chamber is open to the atmosphere and said fluid is ambient air.

10. The apparatus according to claim 7 wherein said particulate matter propelling means comprises an auxiliary Coanda nozzle.

11. A method of dispersing and transporting particulate matter comprising the steps of:
  propelling said particulate matter in a predetermined first direction within a confined flow path of predetermined cross section;
  introducing said particulate matter into a fluidizing zone having a cross section exceeding that of said flow path cross section;
  directing a fluid into said fluidizing zone in a second direction substantially diametrically opposed to said first direction to fluidize and separate said particulate matter; and
  transporting said fluidized particulate matter in a third direction substantially perpendicular to said first and second directions by inducing a fluid flow in said third direction through the Coanda effect, said fluid being ambient air and the Coanda effect creating a vacuum in said fluidizing zone to draw said ambient air into said fluidizing zone in said second direction.

12. The method of claim 11 including the additional steps of intercepting the transported fluidized particulate matter with a curtain of flowing fluid disposed in a plane substantially perpendicular to said third direction, entraining said fluidized particulate matter in said fluid curtain and attaching said fluid curtain and particulate matter entrained thereby to a fluid-flow attachment surface leading away from said plane.

* * * * *